(12) United States Patent
Pietikäinen et al.

(10) Patent No.: US 8,281,671 B2
(45) Date of Patent: Oct. 9, 2012

(54) LOAD MEASURING DEVICE, MANUFACTURING METHOD FOR THE DEVICE AND CONTROL METHOD USING THE DEVICE

(75) Inventors: Reijo Pietikäinen, Järvenpää (FI); Rob Stapels, Jäniksenlinna (FI); Timo Brander, Vantaa (FI); Tony Lehto, Paimio (FI); Jani Yli-Alho, Kaarina (FI)

(73) Assignee: Metso Paper, Inc., Helsinki (FI)

( * ) Notice: Subject to any disclaimer, the term of this patent is extended or adjusted under 35 U.S.C. 154(b) by 328 days.

(21) Appl. No.: 12/523,378

(22) PCT Filed: Jan. 17, 2007

(86) PCT No.: PCT/EP2007/050457
§ 371 (c)(1),
(2), (4) Date: Oct. 13, 2009

(87) PCT Pub. No.: WO2008/086894
PCT Pub. Date: Jul. 24, 2008

(65) Prior Publication Data
US 2010/0071480 A1    Mar. 25, 2010

(51) Int. Cl.
*G01L 5/00* (2006.01)
(52) U.S. Cl. .................................................. 73/862.55
(58) Field of Classification Search ............. 73/862.55
See application file for complete search history.

(56) References Cited

U.S. PATENT DOCUMENTS

| | | | |
|---|---|---|---|
| 4,487,122 A * | 12/1984 | George et al. | 101/153 |
| 5,383,371 A | 1/1995 | Laitinen | |
| 5,562,027 A | 10/1996 | Moore | |
| 5,724,637 A * | 3/1998 | Senba et al. | 399/333 |
| 6,754,973 B2 * | 6/2004 | Takahashi | 33/551 |
| 6,882,807 B2 * | 4/2005 | Sakagami | 399/69 |
| 6,910,376 B2 * | 6/2005 | Maenpaa | 73/159 |
| 6,952,553 B2 * | 10/2005 | Sakakibara et al. | 399/328 |

(Continued)

FOREIGN PATENT DOCUMENTS
DE    10 2005 009 851 A1    9/2006
(Continued)

OTHER PUBLICATIONS

Written Opinion of the International Searching Authority in PCT/EP2007/050457.
Search Report issued in PCT/EP2007/050457.

*Primary Examiner* — Lisa Caputo
*Assistant Examiner* — Octavia Davis-Hollington
(74) *Attorney, Agent, or Firm* — Stiennon & Stiennon

(57) ABSTRACT

A load measuring device for measuring a load acting on an elastically deformable member, has a distance sensor for measuring a length change in response to a deformation of the deformable member under a load. The sensor has a sensing element and a reference element arranged such that a portion of the elastically deformable member is interposed between the sensing element and the reference element. For paper manufacturing or finishing, two members between which the load is measured are cooperating rolls, at least one of which is provided with an elastic cover. One of the rolls includes the sensing element and the other roll includes the reference element. Alternatively, the two members are a roll and a cooperating belt, one having an elastic cover. Also, the sensing element and the reference element may be formed in one and the same member.

34 Claims, 11 Drawing Sheets

U.S. PATENT DOCUMENTS

| | | | |
|---|---|---|---|
| 7,175,580 B2 * | 2/2007 | Wolff et al. | 492/9 |
| 7,187,816 B2 * | 3/2007 | Huang | 385/12 |
| 7,406,876 B2 * | 8/2008 | Krozer et al. | 73/777 |
| 7,620,336 B2 * | 11/2009 | Yura et al. | 399/67 |

FOREIGN PATENT DOCUMENTS

| | | |
|---|---|---|
| EP | 0 219 149 A1 | 4/1987 |
| WO | 2004/102141 A2 | 11/2004 |
| WO | 2008/086894 A1 | 7/2008 |

* cited by examiner

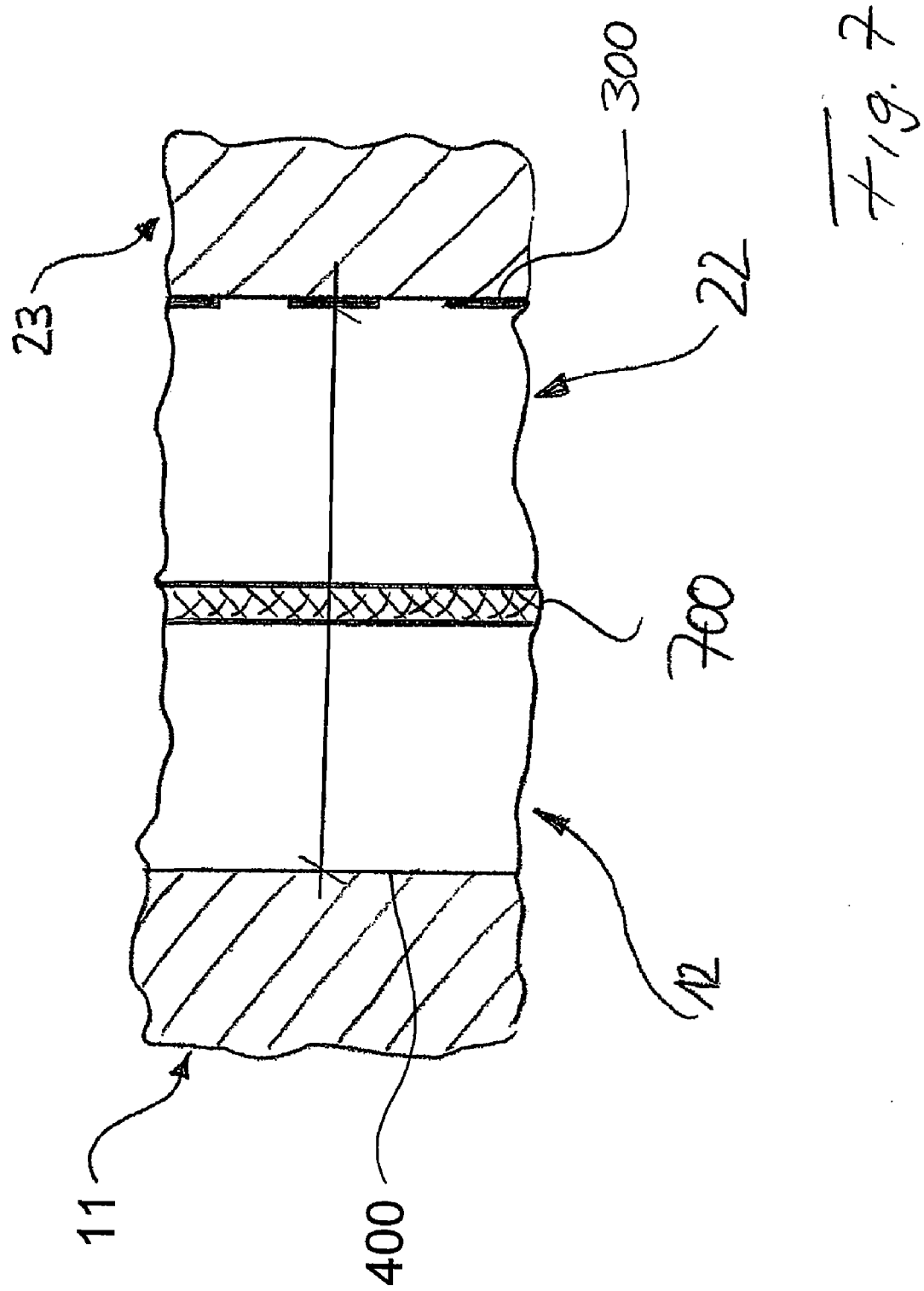

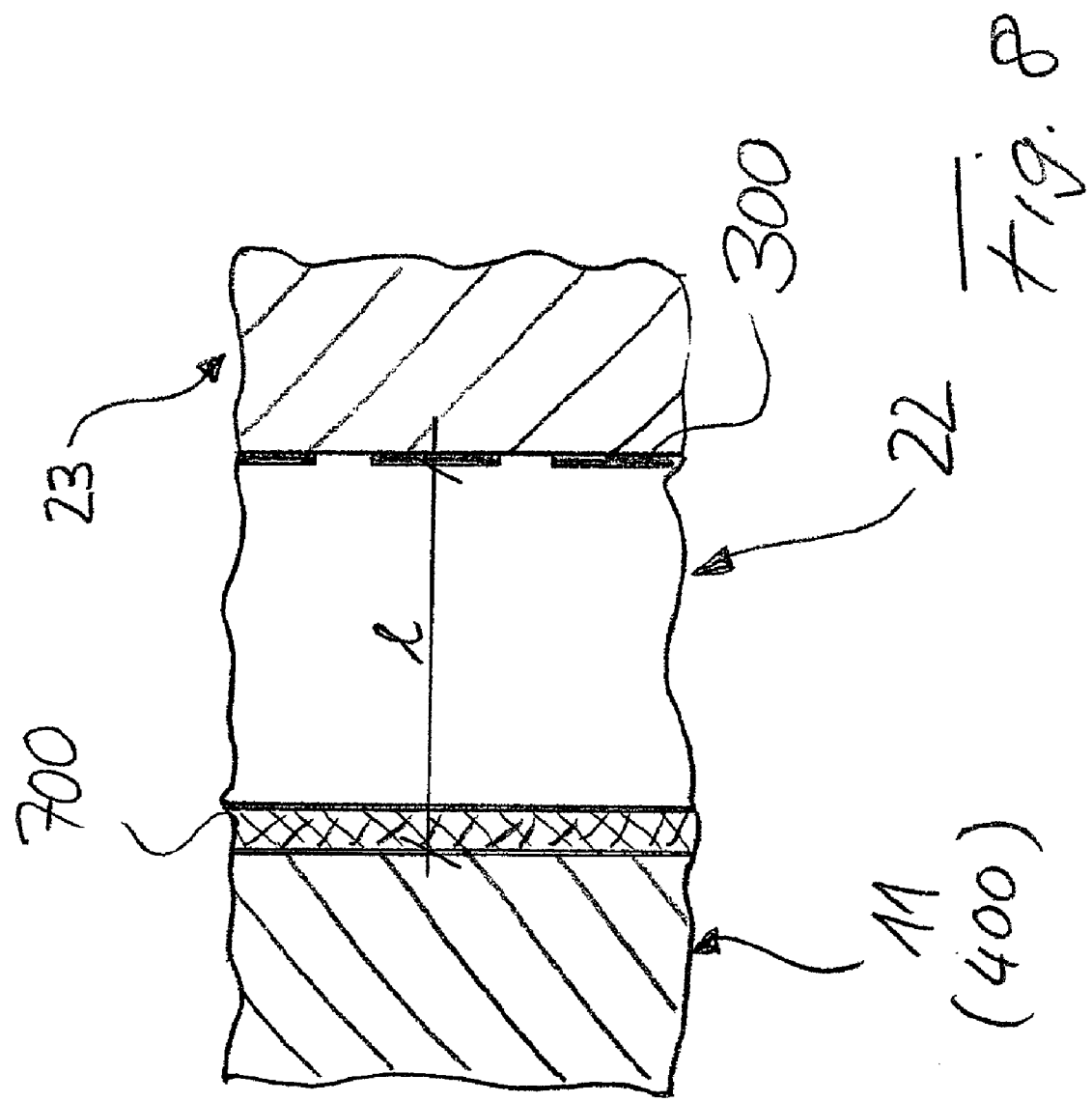

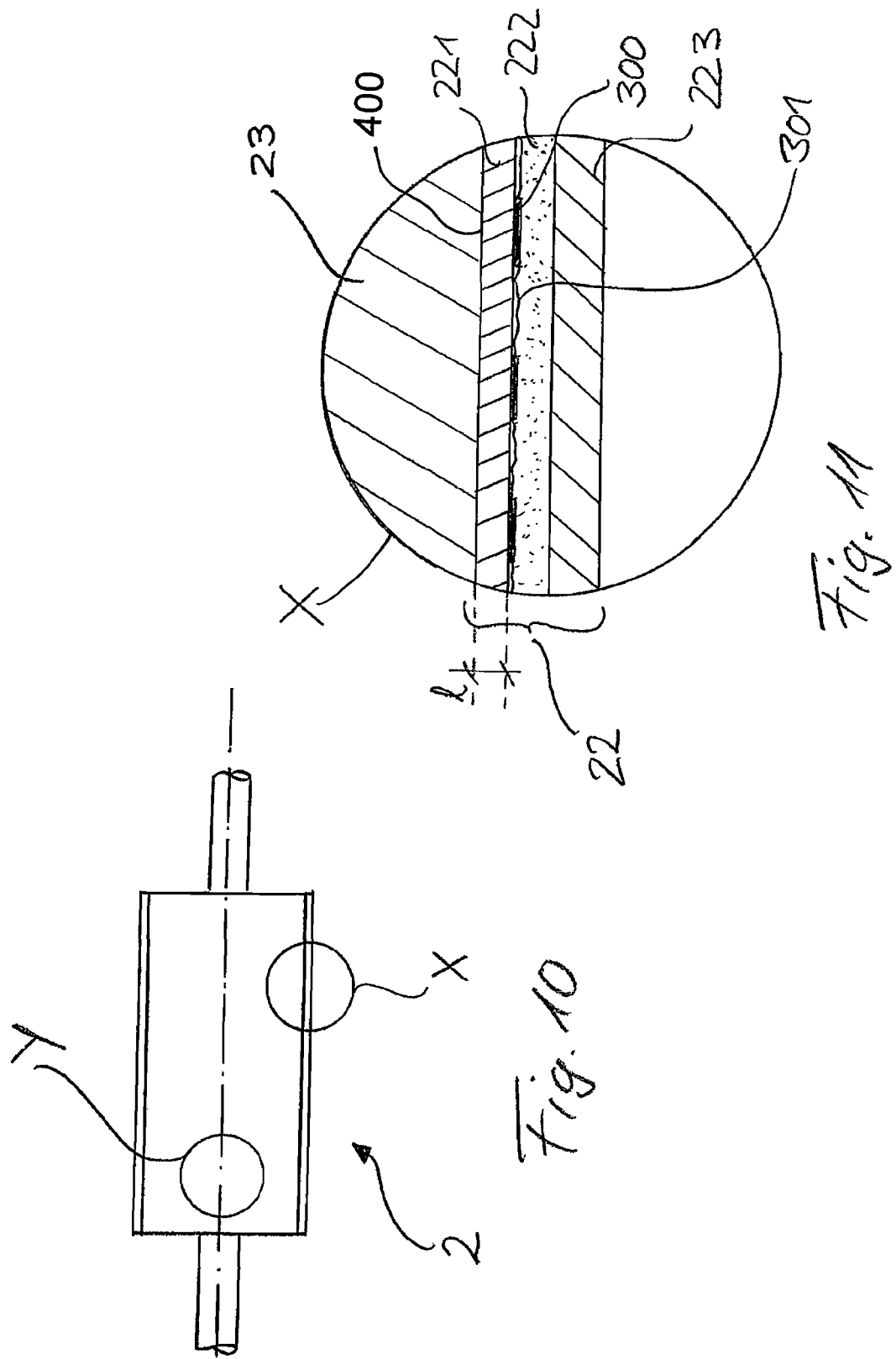

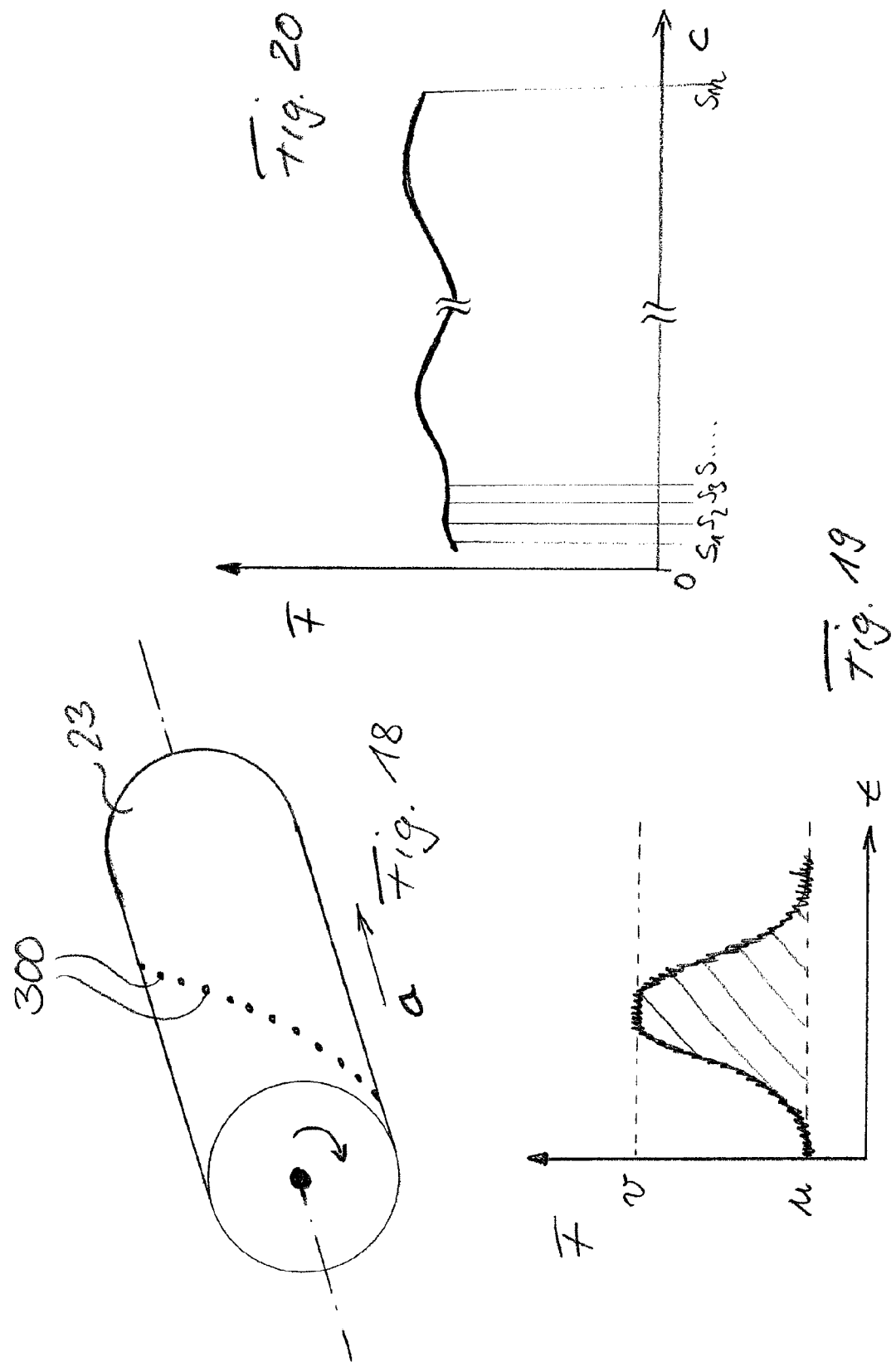

LOAD MEASURING DEVICE, MANUFACTURING METHOD FOR THE DEVICE AND CONTROL METHOD USING THE DEVICE

CROSS REFERENCES TO RELATED APPLICATIONS

This application is a U.S. national stage application of International App. No. PCT/EP/2007/050457, filed Jan. 17, 2007, the disclosure of which is incorporated by reference herein. This application claims priority on said International App. No. PCT/EP/2007/050457.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a load measuring device which is used to measure a load acting on an elastically deformable member. Further, the invention relates to a method for manufacturing such a device as well as to a method for controlling a barring phenomenon in rollers using the device.

SUMMARY OF THE INVENTION

Measuring of a load acting on e.g. a machine element or other mechanically loaded parts or elements is a valuable information in various fields of technology and can be used for various controls.

One typical application of a load measurement is paper manufacturing, board manufacturing, finishing, printing, and other web manufacturing or web processing of paper, board, paper based materials, synthetic materials or textile materials. In this field of application, rolls are widely used which are usually paired so as to be in loaded press contact to form a nip. The conditions in a nip are set to obtain a specific effect on the web material passing through the nip. An important condition in a nip is the nip load in the nip, i.e. the measurement of the actual load being imposed from one roll on the other is an essential technical information, which may be used for various control purposes.

There is various prior art regarding measurement of the load in a nip. For example, U.S. Pat. No. 5,383,371 describes load measurement in a nip between two rolls using a roll furnished with detectors made of a piezoelectric PVDF film which is coated with metal on both sides. The deformation of the piezoelectric material generates a voltage representative of the pressure acting on the PVDF film.

U.S. Pat. No. 5,562,027 further mentions and discusses the use of piezoresistive sensors, strain gages or optical fiber sensors. Piezoresistive materials change their electric resistance in response to pressure applied to the material, thus providing an electric signal representative of the pressure acting on the material. When using strain gage sensors, an indirect measurement of the radial pressure is obtained; this signal needs additional interpretation. Fiber optic sensors can be used in various orientations, and the deformation in axial direction of the fibre in response to pressure. The light waves travelling through the optical fiber undergo reflection and deflection which can provide an indication of pressure through the use of time-domain reflectometry.

WO 2004/102141 describes a sensor consisting of a magnetized conductor which, for example, comprises a nonmagnetic copper conductor coated with a magnetic coating, which may be applied electrochemically. This sensor produces an electrical signal corresponding to the pressure acting on the sensor.

However, sensors of any of the above kinds have their individual drawbacks, such as coarse signal resolution and reduced accuracy, difficulties to apply it to the measurement location, limited durability or, finally, high cost.

SUMMARY OF THE INVENTION

It is the object of the invention to provide a load measuring device which is durable, cheap and can easily be applied to a measurement location.

It is a further object of the invention to provide a manufacturing method for the measuring device according to the invention.

Moreover, it is an object of the invention to provide a method for measuring a barring phenomenon control in a nip of a machine using the measuring device according to the invention.

These objects are solved with a measuring device, a manufacturing method, and a method for barring phenomenon control, and a use of the load detecting device.

With regard to the device for measuring a load according to the invention, this device comprises a distance sensor for measuring a length change in response to a deformation of a deformable member, when the load to be measured is applied to deform this member. In one solution, the distance sensor is adapted for measuring the change of a length due to the deformation, wherein the length extends in a direction coinciding with the load direction.

In one advantageous embodiment of the invention, the distance sensor has a sensing element and a respective reference element. The arrangement may be made such that at least a portion of an elastically deformable member is interposed between the sensing element and the reference element, and the measured change of the length is the change of the distance between the sensing element and the reference element. Preferably, in this arrangement, the sensing element and the reference element are arranged opposite each other in load direction. It is noted that also the elastically deformable member may be deformed by the load in one direction and the sensing element and the reference element are arranged in a direction different to the load direction, so that a secondary deformation of the elastically deformable member which deformation has another direction than the load, is measured. This value may also be taken as indicative of the load applied in load direction.

In a preferred form of the measuring device according to the invention, the sensing element is an eddy-current sensor comprising a spirally arranged conductor and the reference element is a metal element.

In one particular form of the invention, in the measuring device, the elastically deformable member is a machine part of a machine employed in the manufacture of paper, board or other web products so that the measuring device may be directly applied to the respective machine element. In that measuring device, the reference element may also be a machine part made of metal of said machine employed in the manufacture of paper, board or other web products.

On the other hand, the invention can also be put into practice with the metal member being at least one of film, wire, grid, and net made of aluminum, copper or other electrical conductor which may be embedded in, may be applied to a surface of, or may be covered by the elastically deformable member. In these cases, correspondingly, the sensing member may be arranged in a similar way with regard to the elastically deformable member, so that at least a part of it is interposed between the sensing element and the metal member.

In an advantageous embodiment of the device according to the invention, a constitution may be adopted in which the elastically deformable member is an elastic roll cover formed on a hard (metal) core member of a roll, and at least one of said sensing element and said reference element is provided within said cover. Preferably, the sensing element is embedded in the roll cover and the reference element is the metallic or metal covered core member. Alternatively, also the reference element may be embedded in the roll cover.

Although a particular embodiment of the invention is explained above with regard to rolls, the measuring device of the invention may be applied to a belt, so that the elastically deformable member is an elastically deformable belt cover in e.g. paper machines or the like as discussed above. Also here, the sensing element and/or the reference element may be embedded in the belt cover.

Also, the measuring device may be applied to a roller which is paired with a metal belt, wherein the sensing element is embedded in an elastically deformable roll cover and a distance between the sensing element and the belt is measured.

There is a huge field of possible application of the invention. In a particular field of application, the measuring device may be arranged such that an array of at least two distance sensors is used which sensors are disposed one after the other in an extension direction of the elastic member which is not the load application direction, so that load distributions may be measured with the device. In special applications of the invention relating to machines in which the elastic member is movable so as to rotate and/or to move in linear motion, the array of sensors extends in a direction along with and/or transverse to the moving direction of the elastic member, so that load distributions along with or substantially transverse to the moving direction of the elastically deformable member may be measured.

In a possible form of the invention, the elastic member is cylindrical, so as to be rotatable, and contains a plurality of sensors arranged successively in the circumferential direction of the elastic member, so that e.g. a load profile along the circumference of the cylindrical member can be measured, or the load profile of loads applied to the circumference of the rotating cylindrical member when passing a stationary point of contact can be obtained. For example, the sensors may be arranged at regular intervals equal to or larger than 0.1° along the circumference of the cylindrical elastic member. Additionally or alternatively a plurality of sensors may be arranged successively in the axial direction of the cylindrical elastic member, so that a grid of measurement points spreads over the cylindrical member.

In one form of the invention, the measuring device may be used for measuring a load acting between two members biased against each other and having an elastically deformable element between them. For example, the two members are cooperating rolls, at least one of which is provided with an elastic cover, wherein one of the rolls comprises the sensing element and the other roll comprises the reference element. Alternatively, the two members are a roll and a cooperating belt, at least one of which is provided with an elastic cover, wherein one of the roll and the belt carries the sensing element and the other one of the roll and belt carries or forms the reference element. It is clear that both the reference element and the sensing element may be provided in one and the same member, i.e. in one roller or in one belt.

In operation of the measuring device, the deformation of the elastically deformable member, i.e. the elastic cover, is deformed due to the load acting between the two members, so that the deformation of the elastic cover and the resulting change of the distance between the reference element on the one member and the sensing element on the other member is directly indicative of the load acting between these two members. Thus, the actually detected load may be calculated by a suitable calculating means, which may also include suitable display means which may be arranged to display/monitor/record the measured values. It is noted that it may be sufficient to only display relative values, e.g. when the load distribution along a nip width (transverse to the moving direction of the elastic member) shall be monitored or maintained at certain conditions.

With regard to sensor technology, with an arrangement embodying the invention and where one of the cooperating two members which are biased against each other forms the reference element, a simple structure of the device can be realized. For example already the metal core of a roll or of a belt can be used as a reference element, so that only one of the two members has to be adapted to form the measurement device.

The invention further proposes a method of manufacturing the load measuring device according to the invention and as was described and explained in detail above. This method includes the step of forming a core layer of an elastic member on a supporting structure, providing at least one sensing element or at least one reference element on the surface of the core layer of the elastic member, and forming a further layer of the elastic member, so as to cover the sensing element(s) or reference element(s).

In an advantageous embodiment of this solution, the sensing element is provided in the form of a printed eddy-current sensor formed on a substrate of film material, which substrate is placed on the core layer of the elastic member. Since such sensor construction may be made very thin with regard to the biasing direction, and since a further elastic layer is superimposed on the sensors, surface smoothness and uniformity of elastic deformation of the elastic cover may be equalized, so that the sensors do not cause break-off of the elastic material from its core. There are several sensor types applicable to this method, a very thin solution may be obtained when using printed eddy-current sensors formed on the core layer by a lithographic process. In doing so, embedding of the sensor does not cause any considerable change of thickness of the core layer, so that a smooth further layer surface may be obtained. Since the printed solution also forms a tight and strong contact between the core layer and the sensor, the sensor (s) do not form places in which cover delamination starts or is initiated.

The elements equipped with the elastic member may comprise an elastic member which has an elastic roll cover and a support structure which is a metal roll core, or which has an elastic belt cover and a support structure which is a metal wire mesh or other metallic support structure.

A further possible modification of the method includes the step of providing the other one of the sensing element and the reference element on the surface of the further elastic layer of the elastic member, and the formation of an additional layer of the elastic member, so as to cover the sensing element and/or the reference element. Accordingly, the complete sensing arrangement may be arranged in a single elastic member. Further, since the reference element may be any metal surface when the sensing elements are eddy current sensors provided in an array or in a net shaped distribution with respect to the outer shape of the elastic member, there is no alignment required between sensing element and related reference element, which makes manufacture of a sensor equipped elastic member easy.

Alternatively, the sensing element or the reference element may be provided on the surface of support structure, in particular, the core of a roll may be such a support structure. In a particular arrangement, the metal core of the roll may already form the reference element as such, so that only sensors are embedded in the elastic cover materials covering the metal core. Also, sensors may be provided inside the metal core, which arrangement simplifies electric connection of the sensors and the transmission of measured signals to evaluation/control means provided outside the roll.

Finally, precise measure of nip conditions by making use of the measuring device according to the invention allows control of a barring phenomenon in a nip of a machine, particularly in a machine employed in the manufacture of paper, board or other web products. By means of at least one roll equipped with a measuring device as described above, nip pressure at points of the roll passing successively through the nip is measured, and nip pressure fluctuation along the circumference of the roll is obtained. Then, by suitable control, compensating forces to the roll are applied to the roll in a compensating fashion to level out the nip pressure during revolution of the roll. Even if a full compensation of the pressure fluctuations is not obtained, the obtained reduction of pressure fluctuation is sufficient to at least reduce barring phenomenon to an acceptable level. Along with this barring phenomenon control, the grid of sensors in the measuring device can be used to measure a longitudinal (i.e. in the rotational axis direction of the roll) pressure profile along the nip, and the nip pressure profile may be flattened by application of compensating forces based on the measured pressure profile.

In a particular application of the load measuring device, the load to be detected additionally or separately includes a thermal load of the elastic cover. That is, the load detection device is used for the detection of the temperature of the covering at the position of a sensing element. From the difference between the signals when the sensing element passes the nip (and is exposed to the nip load) and when the sensing element is outside the nip, a part of the signal related to the nip load and a part of the signal related to the temperature may be separated, so that a temperature measurement inside the covering is possible. A particular application uses the sensing elements as a resistive temperature sensing element.

Temperature measurement may be used to conclude on material deterioration, the formation of hot spots or the like in order to optimize the load on the roller covering concerned. Temperature monitoring can be conducted easily and an alarm signal may be given if overheating of the covering is observed or tends to occur. Temperature distribution in cross-machine direction over the roller may be observed and the formation of a so-called thermal ring or the appearance of the hot spot phenomenon may immediately be detected. Further, the temperature measurement and the (known) relation between the elasticity and the temperature of the material of the covering may be used to improve the accuracy of the load measurement results.

In the following, embodiments of the invention will be described by reference to the drawings.

BRIEF DESCRIPTION OF THE DRAWINGS

FIG. 7 is an enlarged view of detail C viewed in direction A-A in FIG. 1 on a section through a portion of two rollers in nip contact showing a sixth arrangement of sensing element and reference element.

FIG. 8 is an enlarged view similar to detail C viewed in direction A-A in FIG. 1, showing portions of a hard roller and a soft roller, and showing a section through said portions of the two rollers in nip contact, and showing a seventh arrangement of sensing element and reference element.

FIG. 10 shows a roller in which the positions of details X and Y of FIGS. 11, 12 and 13 are marked.

FIG. 11 shows a detail of a section through a core and an elastic covering equipped with a measuring device according to FIG. 5.

FIG. 18 shows the principle of an arrangement of the sensing elements such that they are mutually offset in an axial direction of the roller and in a circumferential direction.

FIG. 19 schematically depicts the signal obtained from a single sensing element when passing the nip several times.

FIG. 20 schematically shows the evaluation of measured loads from the sensing element arrangement of FIG. 18 for considering the nip load in the axial direction over the roller length.

DESCRIPTION OF THE PREFERRED EMBODIMENTS

Figure 1:
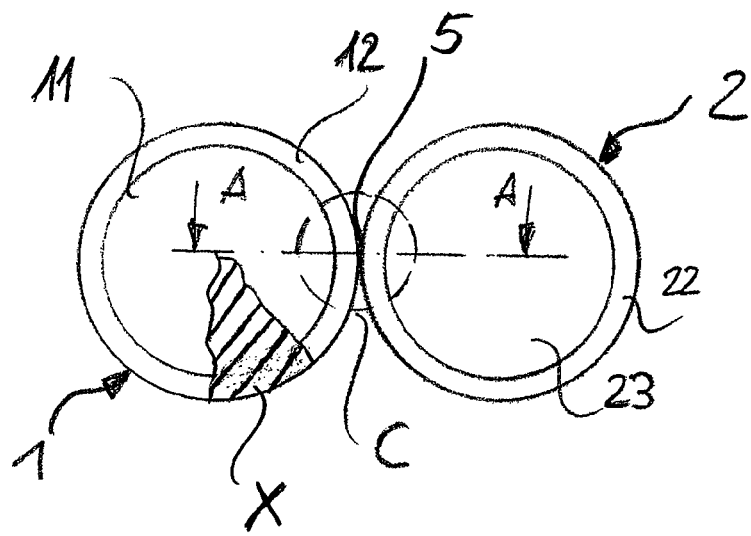
FIG. 1 is a general view for explanation of the position of the section plane viewed in a direction A-A; a view of which is shown in details in FIGS. 2 to 7.

FIG. 1 shows a general view onto the faces of two rollers in their axial direction. The two rollers 1 and 2 are in nip contact with each other. In the nip 5, there is loaded abutment contact between the two rollers 1, 2 and measurement of the pressure in this nip is one example of application of the measuring device for measuring a load which is, in this case, acting between the two rollers.

It is noted that this is a particular application of the measuring device, and it is also possible to use the measuring device in combinations of belts and rollers, and other cooperating machine parts wherein either one of these two elements may form the elastically deformable member.

Also, the load measuring device may be used for measuring loads in statically loaded devices, on support structures of movable and static parts, and the like. In brief, the load measuring device may be applied, whenever the load between two elements is to be measured. Preferably, one of these elements already includes or carries an elastically deformable member which may then be adapted to form part of the load measuring device.

As for the rollers 1, 2 shown in FIG. 1, these rollers may be rollers in a machine involved in paper or board making, paper or board finishing, and other processing of web shaped materials including textile materials, plastic film materials or the like as well as printing processes on the above mentioned materials. Of course, other application of rollers in which load measurement is sensible can be equipped with the load measuring device; preparation of multi-layered foil products, composites of paper and other materials and also melt fusing or gluing of same or different materials to each other are other possible applications.

It is to be stressed here that the load measuring device is not restricted to the application to roller pairs, the device may also be applied to a roller paired with a flat element like e.g. a metal belt, wherein the load measuring device may be arranged in the roller, in the flat element or in both of them, and further, the load measuring device may also be applied in measuring a load acting between structural parts, for example in machine framework or between an actuator and an actuated element so as to reflect a load imposed by the actuator.

As elastically deformable element, a wide range of elements providing elastic deformability may be used, synthetic materials are, however preferred. In this case, it is preferred that the elastic deformable member has substantially no electric conductivity which then allows the use of a wide range of sensors including eddy current sensors as will be detailed later.

In the present description a calender for paper finishing will be taken as an example for explaining the invention. In a calender, paper finishing is obtained by passing the paper through a nip which acts on the paper in a predetermined manner, so as to obtain a predetermined surface finish, like smoothness, gloss etc. Also, calenders may have the form of multinip-calenders in which the web successively passes several nips formed by rollers being in loaded contact. In such calenders a stack of rollers may be arranged one adjacent to the other in a support structure such that the inner rollers of the stack contact both adjacent rollers to form a nip and only one of the rollers of the stack is driven. The web passes through the series of nips to obtain the desired finish by application of heat, moisture, and pressure in predetermined manner.

FIG. 1 shows a single pair of rollers, which may be multiplied and used in the multinip-calender as described above. Further, in FIG. 1 there is shown a circle C which surrounds the nip region of the rollers 1, 2. The dash-dotted line shows the section plane used for the sectional view of the various arrangement of sensors and reference elements seen from the direction A-A (Arrows) and shown in FIGS. 2 to 8.

The left roller 1 shown in FIG. 1 has a covering 12 applied to a core 11, and the right roller 2 has a core 23 and a covering 22 thereon. The core 23 is made of a non-ferrous and electrically non-conducting material which is permeable to electromagnetic waves. For example, glass fibre composite materials or other plastic materials may be used. At least one of the coverings 12 or 22 or at least a part of them may comprise or form an elastically deformable member the deformation of which under load is measured, so as to conclude on the load acting between the two rollers 1 and 2, i.e. in the nip 5. It is noted that, different from the FIG. 1, the invention can be put into practice with only one of the rollers being provided with the elastic covering while the other roller is a hard roller, a metal belt or the like, i.e. has only a metal core which also forms the outside surface thereof as is indicated with the hatched part X of roller 1 in FIG. 1. This principle is adopted in the solution shown in FIG. 8 and is described later. Also, one of the coverings 12 or 22 of one of the rollers 1 and 2 may be a hard covering, e.g. for wear protection, which covering usually has a lower thickness than shown in FIG. 1. Summarily, in the roller pair of FIG. 1, it is sufficient that one of the coverings 12 or 22 shown is elastically deformable.

The load measuring device uses measuring of a change of a length in response to a deformation of the elastically deformable member under the load to be measured. For this, a distance sensor is used. Although several types of distance sensors may be used, it is focused on a distance sensor using a sensing element and a reference element wherein the sensing element is arranged to measure distance change to the reference element.

There are different applications of the distance measurement with regard to the load application direction. FIG. 9 shows the two main cases of load application and resulting distance change measurement.

Figure 9A:
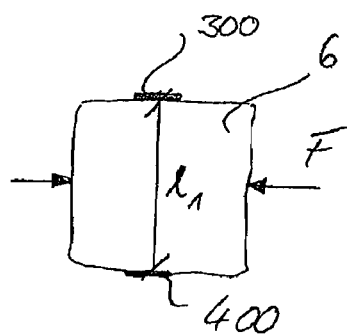
FIGS. 9a-d show different applications of a distance measurement with regard to a load application direction on an elastically deformable body.
Figure 9C:
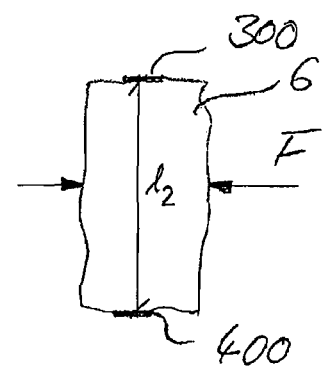
Figure 9B:
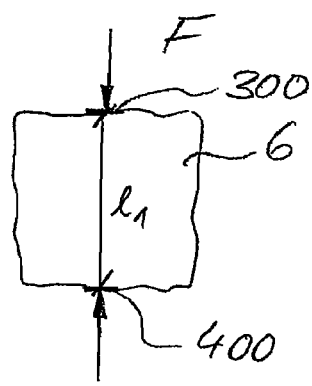

In FIGS. 9*a* and 9*b* the case is shown in which the load application direction and the distance measurement direction are substantially perpendicular to each other. When a load F is applied to a deformable body 6, a length change which is proportional to the applied load will be observed in the direction perpendicular to the load application direction, since at least part of the volume of the elastically deformable material of the body 6 has to escape the applied forces, since an elastically deformable material is not necessarily compressible to the same extent. Accordingly, a change of the length or distance $l_1$ between a sensing element 300 and a reference element 400 changes to a length or distance $l_2$, and the difference can be taken as a representative for the applied forces F.

Figure 9D:
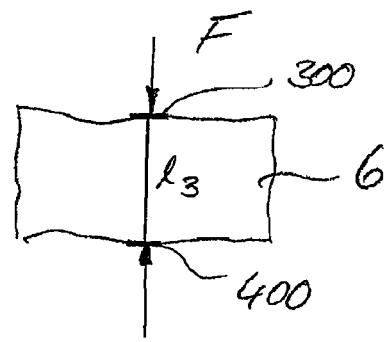

On the other hand, as shown in FIGS. 9*c* and 9*d* the load application direction substantially corresponds to the load application direction. Here, after application of the load F to the elastic body 6 a distance $l_3$ is measured between sensing element 300 and reference element 400 and the difference to the length $l_1$ can be taken as a representative for the applied forces F. It is noted that in case of FIGS. 9*a*, 9*b* the distance increases as the load increases, and in FIGS. 9*c* and 9*d* the distance decreases as the load increases.

In the following, several principal arrangements of the sensing element and the reference element in a load measuring device applied to the pair of rollers shown in FIG. 1 is described. It is noted that the these arrangements adopt or follow the principle shown in FIGS. 9*c* and 9*d*.

Figure 2:
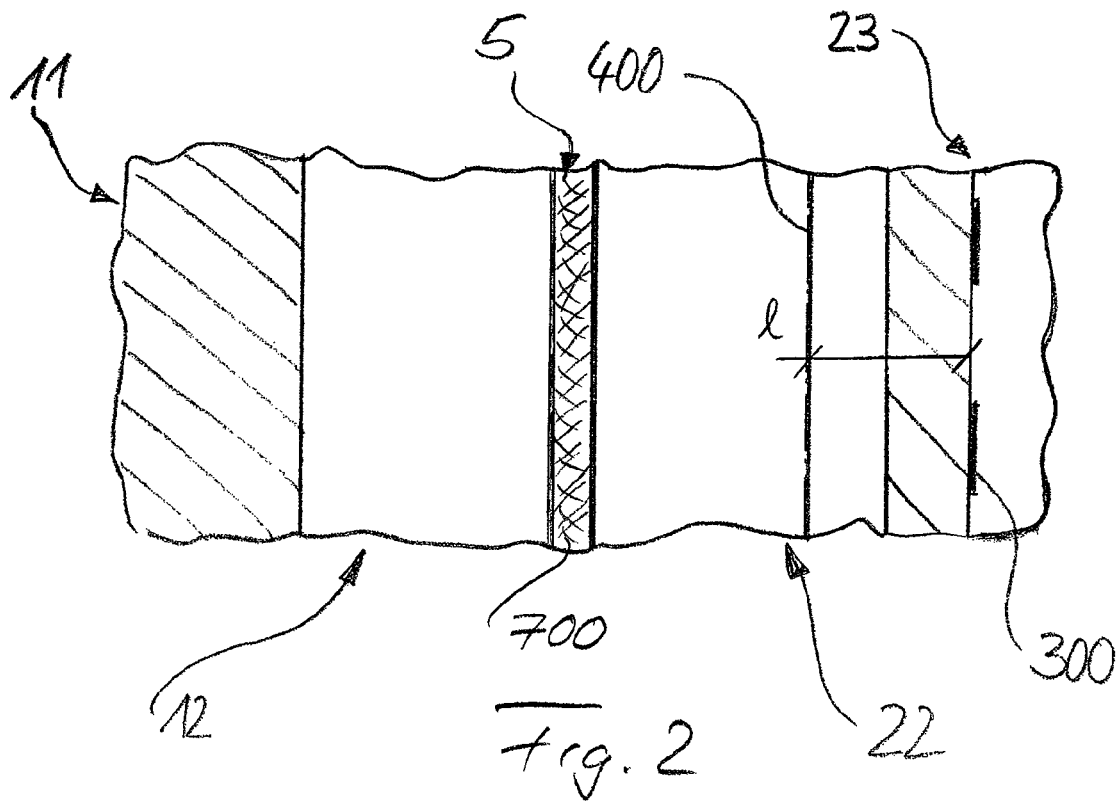
FIG. 2 is an enlarged view of detail C viewed in direction A-A in FIG. 1 on a section through a portion of two rollers in nip contact showing a first arrangement of sensing element and reference element.

FIG. 2 shows a first solution for the arrangement of the sensing element 300 and a reference element 400 in a portion of a roller 2. As can be seen in that drawing, the sensors 300 may be arranged at an inside of a hollow roller core 23, and the reference element 400 is arranged in an opposing manner in the elastic covering 22 of the roller 2.

In operation, the elastic covering 22 of the roller 2 is deformed, and consequently the distance l as shown in FIG. 2 will change to be reduced. By suitable calibration and/or calculation, the relation between the change of the distance l in loaded and unloaded conditions gives a value for the load actually acting in the nip 5 between the rollers 1, 2, where a paper web 700 is nipped.

In the drawing of FIG. 2 the left roller 1 is shown as a roller having a roller core 11 and a covering 12. It is noted that this roller is not necessarily an elastically covered roller but the use of such rollers is possible with the invention as well. Of course, the invention can be applied when roller 1 is a hard roller which has no elastic covering. It is noted that in this embodiment and in the further embodiments one of the rollers may be replaced by a metal belt which itself may be provided with an elastic covering.

As for the type of sensors to be used as sensing elements 300, there are several sensor types usable as long as they are capable of delivering a signal representative of a distance change between the sensor 300 and the reference element 400. The reference element 400 is preferably a metal grid and the sensor 300 is preferably an eddy-current sensor. In this case, the material layers between sensor 300 and reference element 400 must be electrically nonconducting and non-ferrous in order that the electromagnetic signal can be generated/delivered. With regard to the sensor 300 as eddy-current sensor, details will be given further below.

The arrangement shown in FIG. 2 has the advantage that the inner space of the roller 2 can be used for sensor wiring and data transmission to outside the roller 2. For example, wireless data transmission can be used, so that only power supply has to be brought into the roller 2. On the other hand, also wired connection between the sensors 300 inside the roller 2 and a suitable data collecting device outside the roller 2 is possible, e.g. by sliding contacts or other solutions. As for the sensor arrangement, it is shown that two sensing elements 300 are arranged next to each other but also a single sensor or even an array of several sensors arranged in the machine cross direction or even in the form of a grid covering the inner surface of the roller 2 may be used. Applications of these sensor arrangements will be discussed further below.

Figure 3:
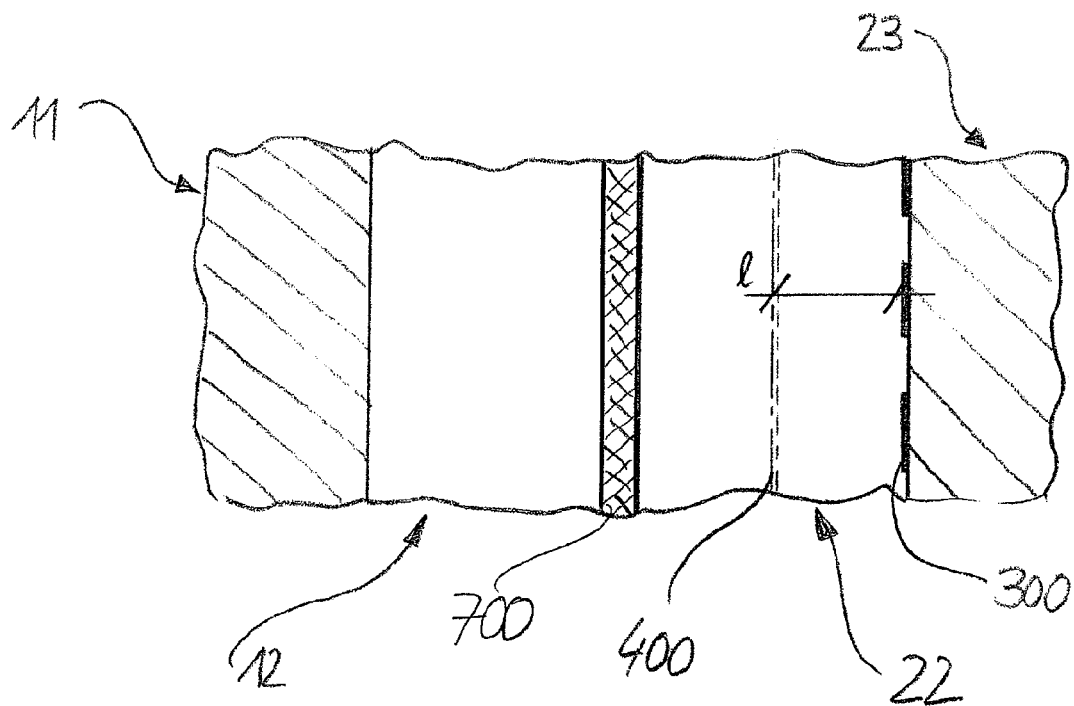
FIG. 3 is an enlarged view of detail C viewed in direction A-A in FIG. 1 on a section through a portion of two rollers in nip contact showing a second arrangement of sensing element and reference element.

FIG. 3 shows another arrangement of the sensing element 300 and the reference element 400 in the roll covering 22 of the roller 2. Here, as can be seen in FIG. 3, the sensing elements 300 are arranged on the roller core 23, and the reference element 400 is arranged in opposing relation to these sensors 300 somewhere in the elastic roll covering 22. Here, the inner volume of the roller 2 is no longer available for sensor arrangement, so that other solutions have to be found with regard to data transmission of the measured signals outside the roller 2. One solution is directly embedding signal processing and sending circuits (not shown) with a common power supply in the covering or on the roller surface. It is noted that suitable radio frequency transmitters are meanwhile commercially available in very small size, which allows embedding the transmitters together with the sensors at the desired location on the roller core 23 or in a basic layer to be applied on the roller core 23.

A simple embodiment of a single sensor is a plain spiral coil formed from electric wiring on a small thin substrate like a circuit board which acts as a coil of an eddy-current sensor. The coil is fed by a pulse generator so that it either oscillates freely or oscillates by constant frequency. By measuring either frequency, power loss or phase shift of the eddy-current sensor, the distance to the reference element 400 can be found.

Connection of the sensors 300 to the outside of the roller 2 may be obtained with a small-sized radio transmitter as mentioned above which may be cast into an edge area of the covering which does not pass the nip. It is even possible to provide a wireless power supply of the measuring system by means of a coil, a suitable capacitor and additional electronics which are placed in the roll. For this, a magnet is arranged statically with regard to the rotating roller and the magnet induces a current pulse in the coil in each revolution. Then, the measuring equipment can be driven by stored electric energy which has been transmitted to an energy storing battery in the manner described above.

Figure 4:
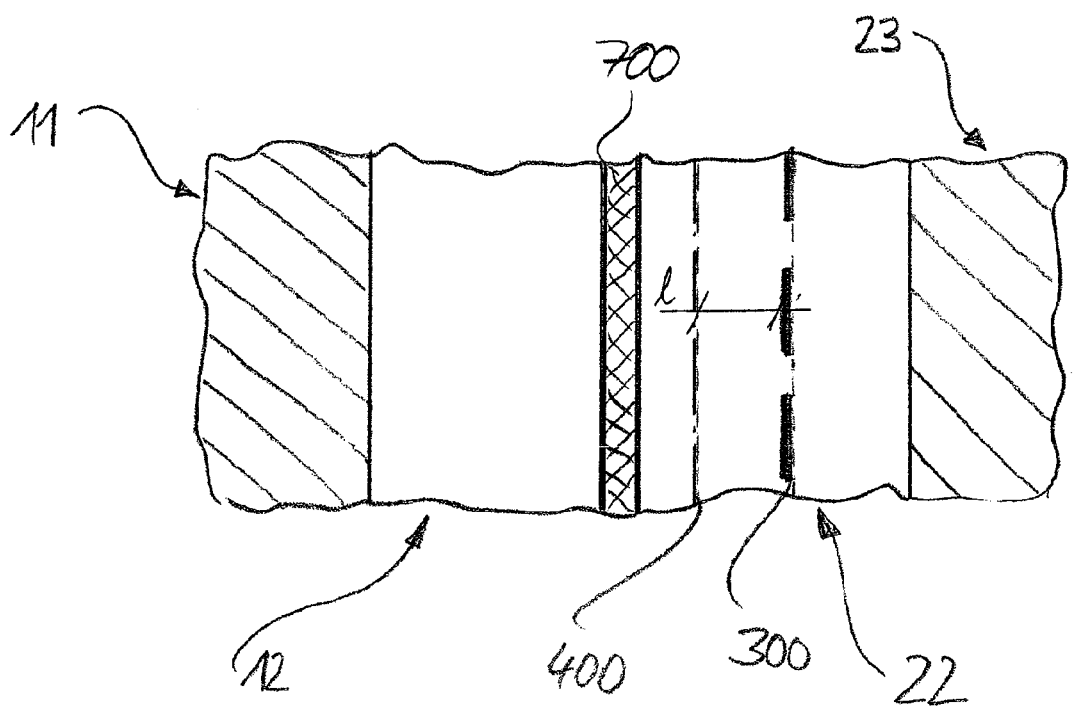
FIG. 4 is an enlarged view of detail C viewed in direction A-A in FIG. 1 on a section through a portion of two rollers in nip contact showing a third arrangement of sensing element and reference element.

Referring now to FIG. 4, another arrangement of the sensing element 300 and the reference element 400 within the elastic covering 22 of roller 2 is shown. Here, sensing elements 300 are embedded in the elastic covering material 23 and, radially outward therefrom in a predetermined distance with the elastic covering therebetween, the reference element 400 is arranged, which, according to the above considerations may be a metal foil or film, a grid, a net or wires. In particular, the structure shown in FIG. 4 is applicable to a multi-layered structure of the elastic covering 22 wherein the sensing elements 300 can be applied to a first or basis covering which is thereafter covered with another layer, onto which the reference element 400 may be applied. Then, a final layer can be applied onto the reference element 400, in order to prepare the final outer surface of the roller 2. As discussed before, the distance l between the reference element 400 and the sensing element 300 is the measured property, in accordance of which the sensing element 300 generates a corresponding signal.

Figure 5:
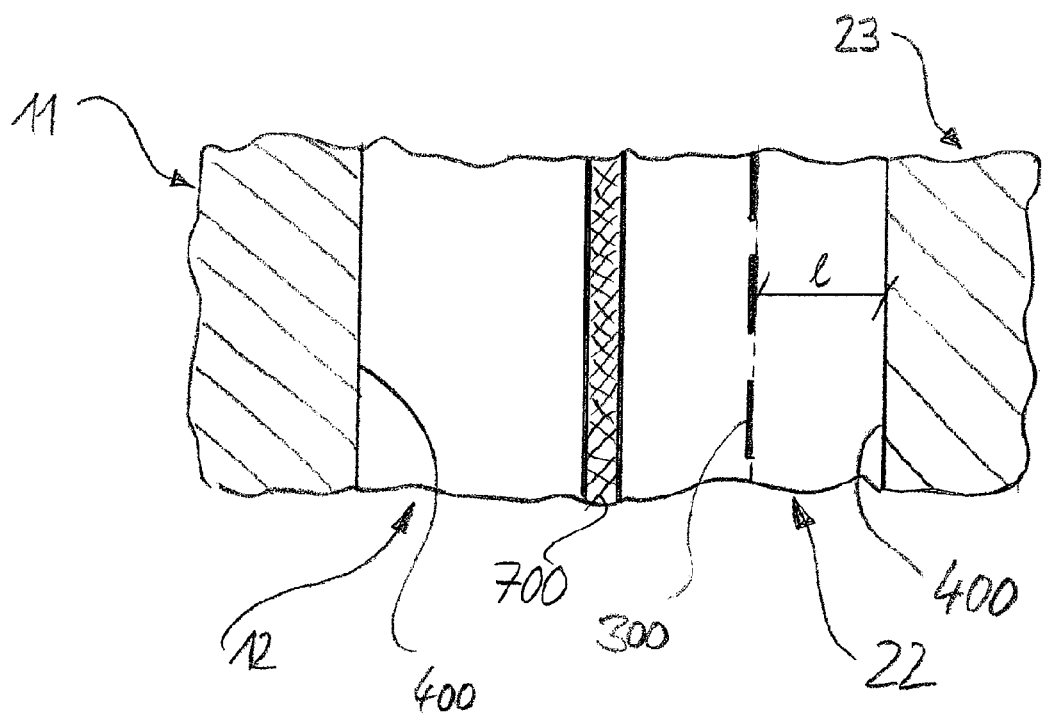
FIG. 5 is an enlarged view of detail C viewed in direction A-A in FIG. 1 on a section through a portion of two rollers in nip contact showing a fourth arrangement of sensing element and reference element.

A further alternative arrangement is shown in FIG. 5, wherein the sensing element 300 is arranged in the elastic covering 22, while the reference element is formed by the roller core 23 itself. In case of metallic roller cores, this can be an elegant solution which only requires that the single layer of materials other than the elastic covering has to be embedded in the elastic covering 22. Here, the property related to the load to be measured is the distance l between the sensor and the roller core 23. The above considerations with regard to materials, sensors, structures and other technical features apply here as well.

Figure 6:
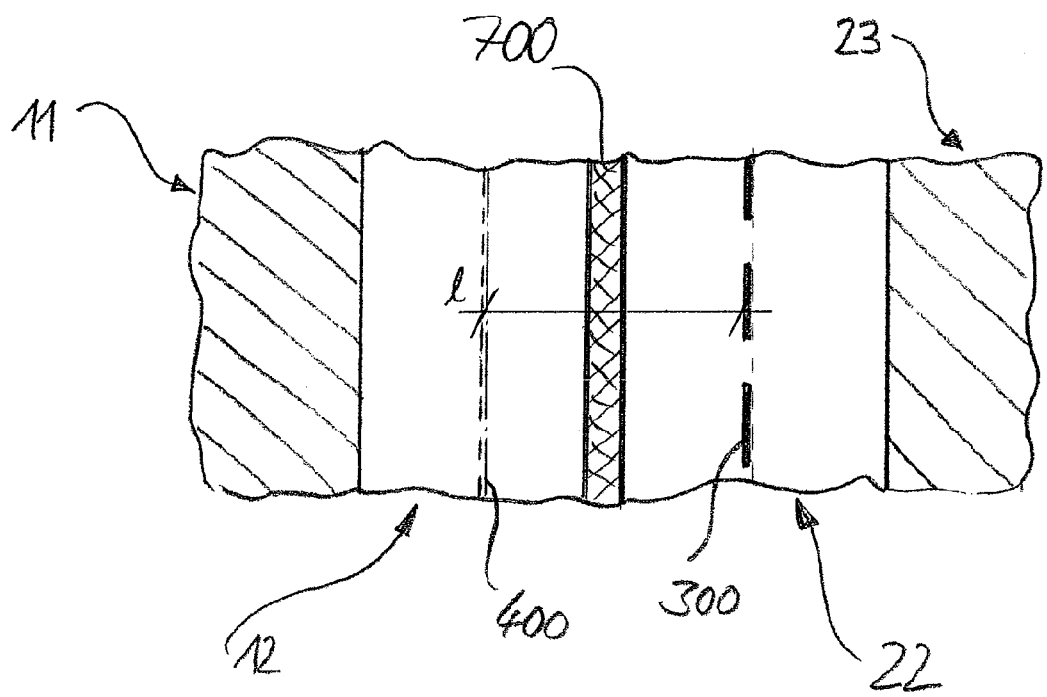
FIG. 6 is an enlarged view of detail C viewed in direction A-A in FIG. 1 on a section through a portion of two rollers in nip contact showing a fifth arrangement of sensing element and reference element.

FIG. 6 shows an arrangement, in which one of the coverings 12 of the two rollers 1, 2 includes the reference element 400, while the elastic covering 22 of the other roller 2 includes the sensing element 300. In particular, elastic covering 12 of roller 1 contains reference element 400 which may consist of a metal foil or film, a metal grid, a net or even single wires. The opposing roller 2 has an elastic covering 22 in which a sensing element 300 is embedded. This sensor is preferably an eddy-current sensor as discussed above. With this sensor arrangement, the distance l between the sensing element 300 and the reference element 400 in the other roller is measured, with this arrangement a large resolution of the measured values can be obtained, because the deformations of two elastic coverings 12, 22 occur and are measured in case of loading the rollers 1, 2 against each other. On the other hand, plastic and/or elastic deformation of the web passing the nip is included in the measured signal. The above considerations with regard to materials, sensors, structures and other technical features apply here as well.

FIG. 7 shows an embodiment in which the sensing elements 300 are arranged on a roller core 23 of a roller and are covered by a covering 22. the covering contacts a paper web 700 in a nip and the paper web 700 is also in press contact with a covering 12 on a roller core 11. The roller core 11 forms the reference element 400. With this arrangement, the use of a separate reference element 400 is not needed when the core 11 is formed from a ferrous and/or electrically conductive material.

FIG. 8 shows a modified form in which there is only one elastic covering 22 involved which sensing elements 300 are embedded which are arranged on a roller core 23. The covering 22 presses a paper web 700 against a hard roller or belt core 11. It is noted that the core 11 may be covered by non elastic hard coatings for establishing particular surface properties such as paper release, corrosion protection, humidity acceptance/reject and the like. Here, similar to FIG. 7, the core 11 forms the reference element 400.

FIG. 11 shows a detail X in FIG. 10 of a roller covering provided with a measuring device according to an embodiment similar to that shown in FIG. 5. As can be seen in FIG. 11, a roller core 23 is covered with a first layer 221 which is a wound layer forming a basis layer for the elastic covering. On this wound layer 221 sensing elements 300 are arranged and are connected with each other by wiring 301. In particular, the sensing element 300 may be provided in the form of printed eddy-current sensor formed on a substrate or film material, which substrate is placed on the core layer 221 of the elastic member 22, or may be formed by forming eddy-current sensors directly on the core layer 221 by a lithographic process. In doing so, embedding of the sensor does not cause any considerable change of thickness of the core layer 221, so that a smooth surface of cover layer 223 may be obtained. Since the printed solution also forms a tight and strong contact between the core layer 221 and the sensor 300, the sensor(s) do not form places in which cover delamination starts or is initiated.

This layer with the sensors 300 is covered by a cast layer 222 of elastic material. Finally, the roller 2 is covered with an outer layer 223 covering the whole measuring device in the roller covering. As is indicated in FIG. 11, the distance, the change of which is measured has a representative for the load, is the distance between the sensing element 300 and the roller core 23, i.e. the roller core 23 forms the reference element 400.

Accordingly, it can be said that the elastically deformable element between the sensor 300 and the roller core 23 is homogenous, so that the relation between deformation and load for this deformable layer is expected to be a continuous relation which reduces calibration effort of the device.

Figure 12:
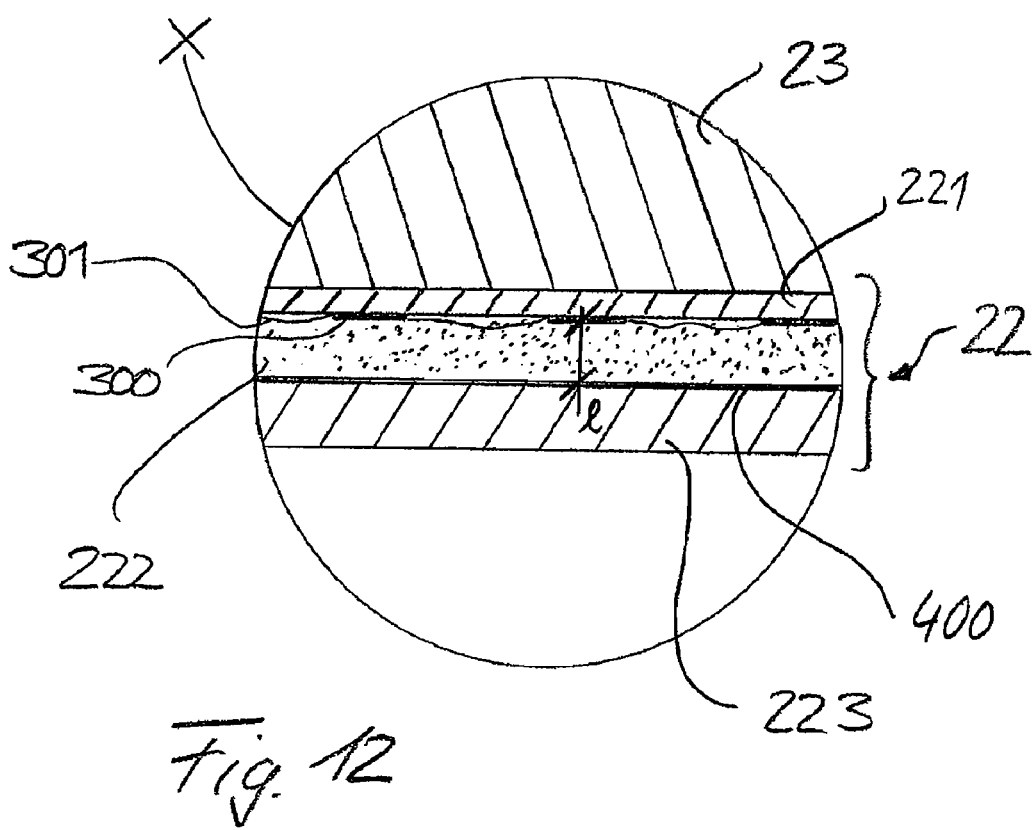
FIG. 12 shows a detail X of a section through a core and an elastic covering equipped with a measuring device according to FIG. 4.

FIG. 12 shows an alternative arrangement which corresponds to the arrangement shown in FIG. 4. As shown in FIG. 12, a roller core 23 is covered with a first layer 221 which may be a wound layer and on this first layer 221 there is arranged an array of sensors 300 which are connected to the respective data acquisition and evaluation device by suitable wiring 301. Then, a cast layer 222 is applied on the sensor carrying first layer 221. Then, a metal foil or grid or net 400 is applied on this cast layer 222. On this reference element 400 made from metal an outer layer 223 is applied. As is indicated in FIG. 12, the distance to be measured as a representative for the load is the distance l between the sensor surface 300 and the reference element 400. That is, a deformation of the cast layer 222 is measured. Also, here the deformation of a single layer forms the basis for the measurement, so that also a continuous relation between deformation and load is expected and calibration is simpler. It is noted that the present application also embraces the method for forming the above sensing roller types.

Figure 13:
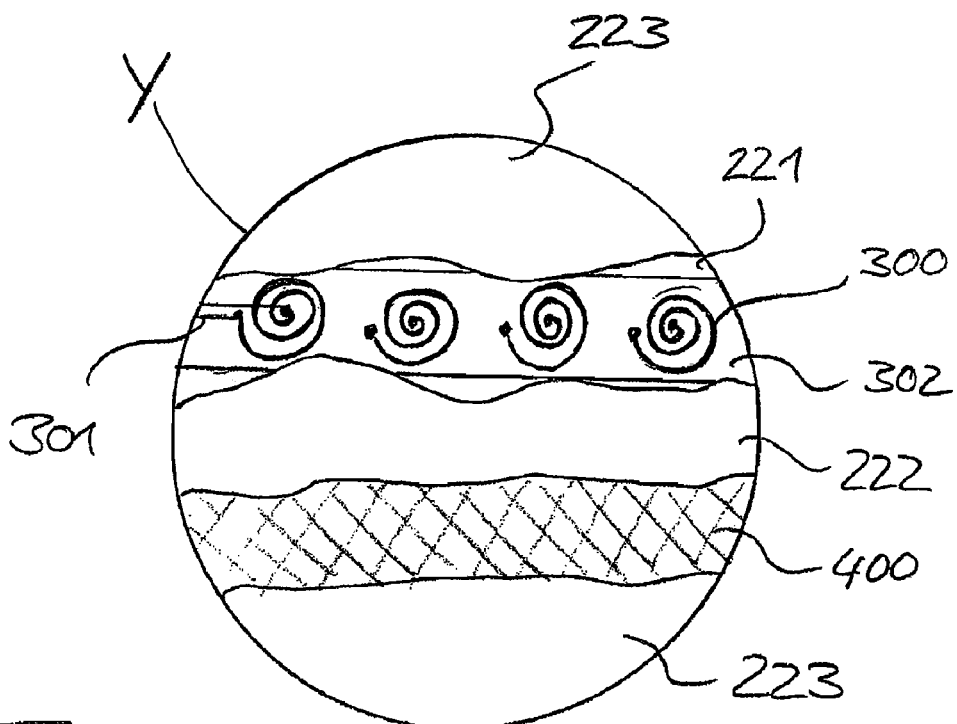
FIG. 13 shows a particular solution inside an elastic roller cover as a detail Y with several layers broken open to allow for a look inside.

FIG. 13 shows a particular solution inside an elastic roller cover as a detail Y with several layers broken open to allow for a look inside. The structure substantially corresponds to that of FIG. 12 but it has to be mentioned that this structure may be also modified to obtain any of the possible arrangements shown in FIGS. 2 to 6. As can be seen in FIG. 13, an inner layer or wound layer 221 carries spirally-shaped sensor elements 300. The sensors 300 are arranged in a row on a strip 302. This strip can be a suitable film material on which the sensor spirals are formed by using known technology like vapor deposition, thin film application, printing of conductor paste, and the like. The strips 302 may also have embedded or previously applied wiring 301, which may also have been formed by the afore-mentioned techniques. It is noted that strip 302 may also be made of materials on which the spirals for the sensors 300 and/or the wiring 301 for the sensors can be formed by techniques like etching or machining.

It is noted that such a strip 301 is not necessarily and exclusively applied to extend in a direction coinciding with the rotational axis of the roller, but plural strips may be arranged in parallel, in order to form a sensor grid covering parts or almost the whole circumference of the roller layer 221. Also, oblique arrangements of such sensor arrays with regard to the rotational axis of the roller are possible and may, for example, be of particular benefit regarding data acquisition. For example, with such an oblique arrangement, it can be arranged such that the sensors of one strip successively pass through the nip where the load is to be measured, so that suitably collecting data in time intervals simplifies data acquisition and provides a measurement of a load distribution on a spiral line winding around the roller. From this line, nip load distribution along the rotational axis on the roller can be concluded as will be further described with reference being made to FIGS. 18 to 20 below.

As can further be seen in FIG. 13, the cast layer 222 is applied so as to cover the strip 302 of sensors 300. Thereafter, a net of thin metal wire 400 is disposed on this cast layer 222 before the outer layer 223 is applied thereon.

In the foregoing, the inner layer was described as a wound layer, the intermediate layer was named to be a cast layer. Of course, any suitable order of these layers for the particular purpose of the roller may be selected. Further, the roller may have layers of one type only.

Figure 15:
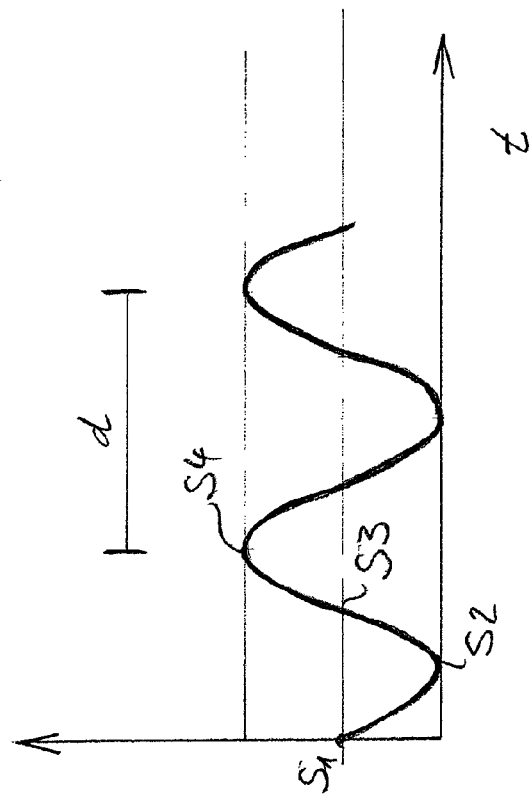
FIG. 15 shows measured loads with the measuring devices of FIG. 14.

Hereafter, referring to FIGS. 14 and 15, an application for periodic nip vibration detection using the measuring device will be explained.

Figure 14:
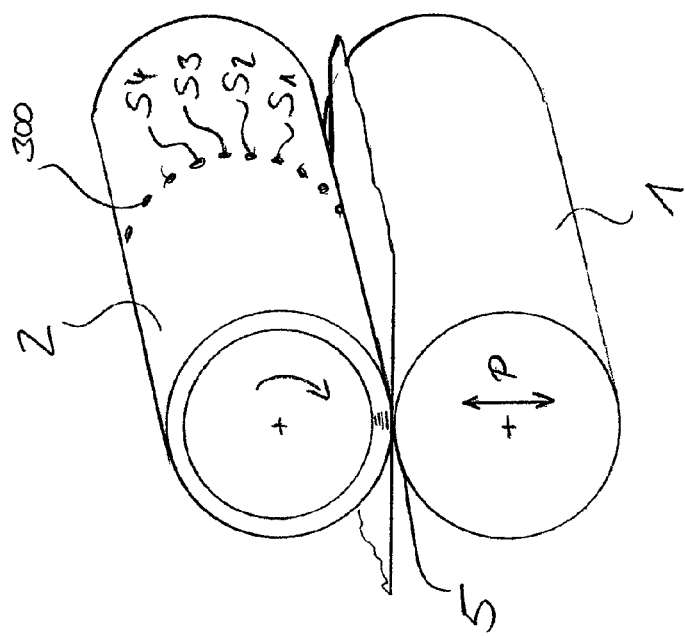
FIG. 14 shows a possible distribution of load measuring devices in a roll covering for barring phenomenon control.

Periodic nip vibration, a so-called barring phenomenon can occur when rollers in press-contact to form a nip 5 rotate in the manner shown in FIG. 14. Here, as is indicated with arrow P in roller 1 of FIG. 14, the vibration of the two rollers 1, 2 relative to each other occurs. This load vibration may adversely affect the intended web treatment in the nip and cause damage of roll coverings by repeatedly imposing high loads on the same location of the elastic cover so that breakout of the elastic covering is more likely to occur at these locations.

It was found that the load measuring device of the present application can be used in advantageous manner for this measuring and control task. As is seen in FIG. 15, on the abscissa there is time and on the ordinate there is signal strength from the sensors depicted. If one now numbers the sensors which successively pass the nip as is shown in FIG. 14 by giving them numbers S1, S2, S3, S4 . . . , and if one then depicts the respective sensor signal in FIG. 15, one finds a measured curve representing load oscillation in the nip 5. This measured signal can be used to compensate the nip load vibration by suitably imposing a counter load e.g. at the journals of the rollers.

It is noted that for an accurate detection a dense distribution of the sensors is beneficial but this, of course, significantly increases data acquisition and evaluation. In order to obtain frequency and load of the barring phenomenon, the minimum distribution, however, is seen in half the period of the sinus in order to get reliable results. For example, the counter load applied to the journals of the rollers or to the support structure of at least one roller may be a load vibration with the same amplitude and frequency but offset to the bearing load vibration, so that an extinction of this roller vibration can be obtained.

Figure 16:
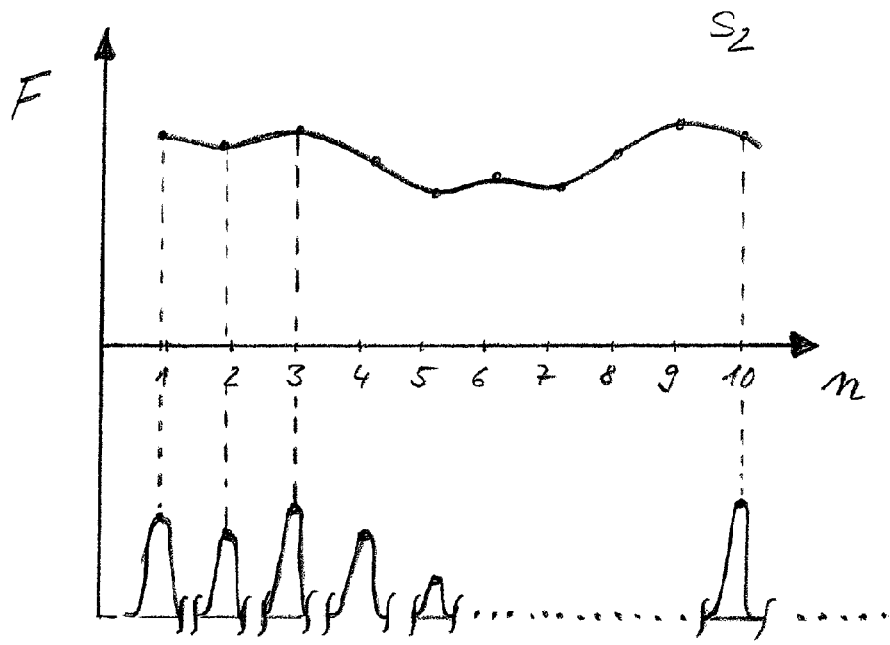
FIG. 16 schematically depicts measured loads of a single sensing element during several revolutions of the roller.

FIG. 16 schematically depicts measurement results of single sensor S2 (sensing element) when using continuous measurement method. With each revolution, the sensor S2 passes through the nip once. When the measured values (signal or Force F) of each nip passage of the sensor are collected over a number of revolutions n, there is the possibility to obtain average load values, trends in absolute and relative changes, and other statistic values which may be used to define and understand long-time operation behavior of the covering/roller/nip/web-system. This can be done with each and every sensor. For detecting the passage through the nip there is a clear peak value obtained form the signal shape shown in the lower part of FIG. 16. Therefore, an easy and precise roller condition monitoring is possible with the measuring device.

Figure 17:
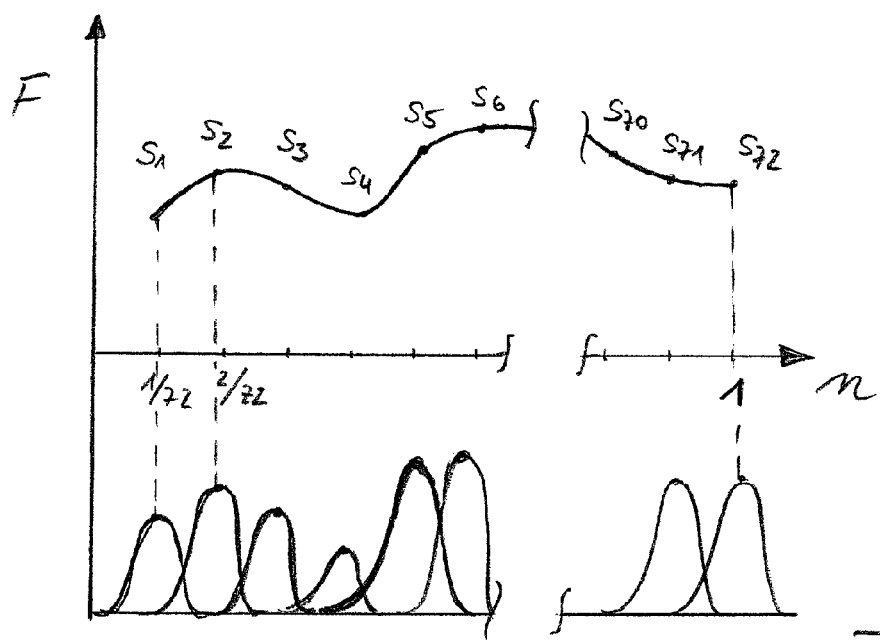
FIG. 17 schematically depicts measured loads measured with a set of sensing elements distributed around the circumference of a roller during one revolution.

FIG. 17 shows an evaluation of an array of a plurality—here seventy-two—of sensors S1 to S72 (sensing elements) arranged circumferentially around the roller in a manner as is e.g. shown in FIG. 14. In FIG. 17 there is schematically shown a graph depicting the measured signal of each sensor S1 to S72 during one revolution of the roller. The successive signals have a certain time overlap during increase towards and decrease from a peak value as is shown in the lower part of FIG. 17. The peak value represents the actual force value in the nip and is therefore taken as the measured value. From these values, a force curve over the roller revolution is obtained. Within this curve, interpolation between the values allows to find force values at any circumferential position on the roller. Of course, more than one of these curves can be recorded so as to obtain long-term data and to conclude on the long-term behavior of the roller.

FIG. 18 shows an arrangement of a plurality of sensors (sensing elements 300) on a roller core 23 wherein each sensor is offset in axial (direction a) and circumferential direction as compared to the adjacent sensors (s). If the offset is constant in both direction between each of the sensors, the sensors form an array which is linear and winds obliquely around the roller core 23.

Collecting the data of multiple passages of a single sensor through the nip generates a signal F the shape of which is schematically shown in FIG. 19. That is, if the sensor output is graphically depicted, the graph substantially looks like FIG. 19. It is noted that the sensor signal F must not necessarily return to zero after the sensor has passed the nip, but there may be a signal offset u which can include temperature stresses or the like. When the sensor detect the full load, signal goes up to a level v. The difference between these two (average) values of a single sensor when passing the nip is the signal amplitude of the maximum nip load. With the sensor array as shown in FIG. 18 and using the signal amplitude of each of the sensors, one may obtain the nip load distribution in the axial direction of the roller, which is often named cross-machine direction (CD) Thus, a CD-nip load profile is obtained.

The use of the differential principle, i.e. the signal amplitude is defined as a difference between two measured values (v-u), automatically compensates influences on the measured values like temperature, delays in restoring of a covering from deformation and other effects which may adversely affect the quality of the measurement. Also, from the integral under the curve of FIG. 19 (hatched area) one can also measure the nip impulse. This information can be useful in process control and also for investigating/monitoring material behavior and specific material loads.

Finally, one may also use the eddy current sensors described above for measurement of the temperature in the covering into which the sensor is embedded. The spiral eddy current sensor is used as a resistive temperature sensing element. This measurement may be used to conclude on material deterioration, the formation of hot spots or the like in order to optimize the load on the roller covering concerned. In particular, temperature monitoring can be conducted easily and an alarm signal may be given if overheating of the covering is observed.

Also temperature distribution in cross-machine direction over the roller may be observed with a sensor arrangement as is e.g. shown in FIG. 18. With this instrument, the formation of a so-called thermal ring (a local overheating due to overload at a particular nip position) may immediately be detected. Further, the temperature measurement and the (known) relation between the elasticity and the temperature of the material of the covering may be used to improve the accuracy of the load measurement results. Further, an increase in temperature and elasticity is an indication of local heat generation inside the cover material, so that the measured values may also be used to detect the phenomenon of hot spot formation.

The invention claimed is:

1. A device for measuring a load applied to an elastically deformable roll cover in a paper, board, or web machine, comprising;
   a roll core, having an outer surface;
   an elastic deformable roll cover formed on the roll core, to form a first roll;
   a distance sensor comprising a sensing element spaced from a reference element so that at least a portion of said roll cover is interposed between the sensing element and the reference element, the distance sensor arranged for measuring a length change in said portion of said roll cover between the sensing element and the reference element in response to a deformation of said portion of said roll cover, under said load; and
   wherein at least one of said sensing element and said reference element is positioned within said roll cover.

2. The measuring device of claim 1 further comprising a metal belt cover engaged with the roll cover forming the reference element.

3. The measuring device of claim 1 further comprising a loading member in loading engagement with the elastic deformable roll cover to define a load direction.

4. The measuring device of claim 3 wherein the loading member is a second roll which engages the elastic cover of the first roll, wherein one of said first roll and said second roll incorporate said sensing element and the other roll incorporates said reference element.

5. The measuring device of claim 3 wherein the loading member is a cooperating belt, wherein one of said first roll and belt contains said sensing element and the other one of said first roll and belt contains or is said reference element.

6. The measuring device of claim 1 wherein said distance sensor is arranged for measuring the change of a length extending in a direction coinciding with the load direction.

7. The measuring device of claim 1 wherein said sensing element and said reference element are arranged opposite each other in the load direction.

8. The measuring device of claim 1, wherein said sensing element is an eddy-current sensor comprising a spirally arranged conductor and said reference element is a metal member.

9. The measuring device of claim 8 wherein the reference element is a machine part made of metal in said paper, board, or web machine.

10. The measuring device of claim 8 wherein said metal member comprises at least one film, wire, grid, solid structure, or net, made of ferrous or electrically conductive material.

11. The measuring device of claim 1 wherein said sensing element is embedded in said roll cover and said reference element is formed by an outer surface of said roll core, so that at least a portion of said roll cover is between the outer surface of said roll core and the sensing element.

12. The measuring device of claim 1 wherein said sensing element and said reference element are both embedded in said roll cover, with at least a portion of said roll cover interposed between the sensing element and the reference element.

13. The measuring device of claim 1 wherein the distance sensor is one of a plurality of distance sensors disposed one after the other in an extension direction of the elastic deformable roll cover which is not a load application direction.

14. The measuring device of claim 13 wherein the roll core is mounted for rotation about an axis and said elastic deformable roll cover formed on the roll core is thus also mounted for rotation about said axis, the rotation defining a circumferential direction wherein said plurality of distance sensors form an array extending in the circumferential direction along a circumference of the roll cover.

15. The measuring device of claim 14 wherein the distance sensors forming the array are arranged at regular intervals of at least 0.1° along the circumference of the roll cover.

16. The measuring device of claim 13 wherein the roll core is mounted for rotation about an axis and said elastic deformable roll cover formed on the roll core is thus also mounted for rotation about said axis, the rotation defining a circumferential direction wherein said plurality of distance sensors form an array extending transverse to the circumferential direction and in a direction defined by the axis.

17. The measuring device of claim 1 further comprising a device connected to the sensing element to calculate the load acting on said elastically deformable member as a function of said measured length change.

18. The measuring device of claim 1 wherein the at least one sensing element comprises at least one printed eddy current sensor formed by a lithographic process on a layer of the elastic roll cover.

19. The measuring device of claim 1 wherein the roll core is formed of metal.

20. The measuring device of claim 1 wherein the elastic roll cover has a core layer on the roll core, and at least one sensing element or at least one reference element is on an outer surface of said core layer, and a further layer of the elastic roll cover covers the at least one sensing element or reference element, the further layer having an outer surface.

21. The measuring device of claim 20 wherein the other one of said at least one sensing element or at least one reference element is on the outer surface of the further layer of the elastic roll cover, and
an additional layer of the elastic roll cover is arranged to cover said other one of said at least one sensing element or at least one reference element, and the outer surface of the further layer of the elastic roll cover.

22. The measuring device of claim 1 wherein one of said sensing element and said reference element is on the outer surface of said roll core.

23. A method of measuring a load applied to an elastically deformable roll cover in a paper, board, or web machine, comprising the steps of:
forming the elastic roll cover which defines an outer surface, on a roll core, to form a first roll, wherein the elastic roll cover defines an outer surface, and a circumference, and during construction positioning either a sensing element or a reference element on the roll core or between the roll core and the outer surface;
loading a second roll against the first roll to form a nip therebetween, the nip containing a web therein, so that the second roll deforms the elastic roll cover of the first roll;
positioning the other of the sensing element or reference element, on an outer surface of the second roll or within an elastic cover on the second roll, or within the elastic roll cover of the first roll, so that the sensing element and reference element, are spaced from each other with at least a portion of the elastic roll cover between the sensing element and the reference element; and
measuring deformation of the portion of the elastic roll cover by measuring a change in length in said portion of said roll cover between the sensing element and the reference element, as the first roll and the second roll rotate one against the other in loaded nipping engagement, such that a distance between the sensing element and the reference element changes in accordance with a period of rotation of one of said first and second rolls.

24. The method of claim 23 wherein the at least one sensing element is a coil, and wherein the coil is fed by a pulse generator, and wherein either frequency, power loss or phase shift within the coil is used to measure the distance between the coil and the reference element.

25. The method of claim 23 further comprising controlling periodic nip vibration by:
measuring nip pressure at a plurality of points of the first roll with a plurality of the sensor element which are arranged to pass successively through the nip;
deriving nip pressure fluctuation from the measured values developed along the circumference of the roll; and
applying compensating forces to the first roll and the second roll so as to reduce pressure fluctuation in the nip based on the measured nip pressure fluctuation.

26. A control method according to claim 25 further comprising the steps of:
measuring a longitudinal pressure profile along the nip with a plurality of the sensor elements positioned spaced along the nip, and
flattening nip pressure profile by application of compensating forces based on the measured pressure profile.

27. A method of measuring loading and temperature of an elastically deformable member comprising the steps of:
using a distance sensor to measure a change in length of the elastically deformable member as the elastically deformable member responds to a deformation under said loading;
wherein at the same time as said distance sensor produces a length change related signal at least a part of said distance sensor produces a temperature related signal different from the length change related signal; and simultaneously measuring temperature and distance with said distance sensor, and wherein said temperature related signal is used for measuring the temperature at the distance sensor.

28. The method of claim 27 wherein resistance of the distance sensor is used as the temperature related signal.

29. The method of claim 28 wherein the distance sensor uses a coil to sense an eddy-current and the coil is used as a resistive temperature measurement element to produce said temperature related signal by resistance change according to temperature.

30. The method of claim 28 wherein the measurement of the temperature is conducted separately from the measurement of the length change.

31. A device for measuring a load applied to an elastically deformable belt cover in a paper, board, or web machine, comprising;
   a roll core, having an outer surface;
   an elastic deformable belt cover engaged with the roll core;
   a distance sensor comprising a sensing element spaced from a reference element so that at least a portion of said elastic deformable belt cover is interposed between the sensing element and the reference element, the distance sensor arranged for measuring a length change in the portion of the elastically deformable belt cover between the sensing element and the reference element in response to a deformation of said portion of said elastically deformable belt cover under said load; and
   wherein at least one of said sensing element and said reference element is positioned within said belt cover.

32. The measuring device of claim 31 wherein said sensing element and said reference element are embedded in said belt cover with the portion of said elastic deformable belt cover therebetween.

33. The measuring device of claim 31 wherein the elastic belt cover has a metal support structure.

34. The measuring device of claim 31 wherein the metal support structure is a metal wire mesh.

* * * * *